May 17, 1932. A. ZECH 1,858,977
COWL VENTILATOR
Filed Nov. 17, 1930
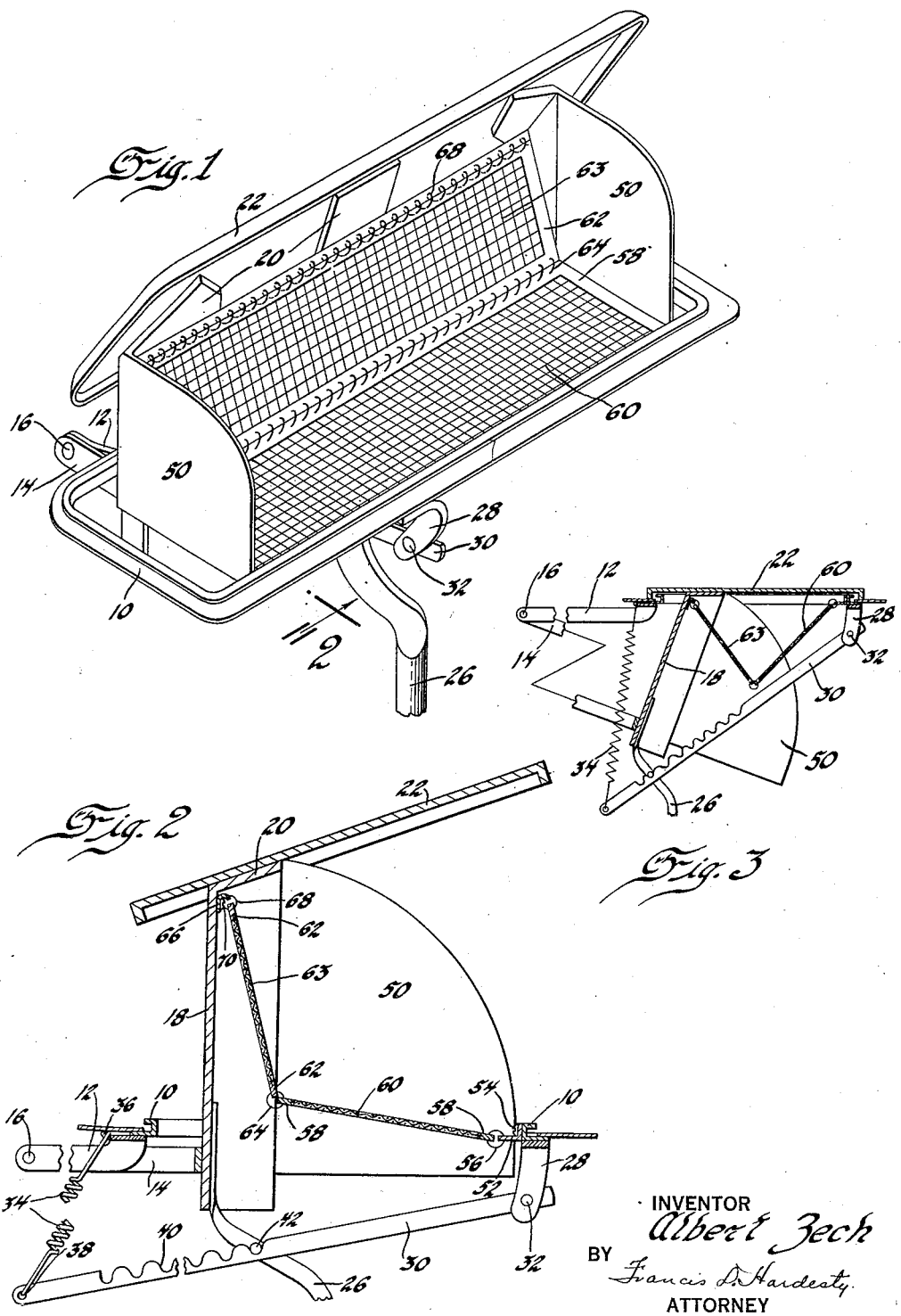
INVENTOR
Albert Zech
BY
Francis L. Hardesty
ATTORNEY Patented May 17, 1932

1,858,977

UNITED STATES PATENT OFFICE

ALFRED ZECH, OF DETROIT, MICHIGAN, ASSIGNOR TO INDUSTRIAL WIRE CLOTH COMPANY, OF WAYNE, MICHIGAN, A CORPORATION OF MICHIGAN

COWL VENTILATOR

Application filed November 17, 1930. Serial No. 496,134.

This invention relates to cowl ventilators for use with automobiles.

It has been observed that openings in the cowls of automobiles are the source of entry into the closed body of vehicles, of bees, flies, etc., and the presence of these in the body is very often a source of annoyance as well as a potential source of injury to the occupants of the vehicle.

It has, therefore, become apparent to the industry that some sort of screen be provided in the openings where the cowl ventilators are positioned and an object of this invention is a screen for this purpose.

A still further object is a screen which is more or less flexible as a whole with respect to the stationary parts of the vehicle, the screen having its forward edge fixed to the stationary rim of the ventilator and having its upper edge secured to a back wall of the ventilator near the upper edge of a plate, the latter serving as the support for the ventilator cover or shutter.

A still further object is a screen which can be fabricated and mounted upon the body as a whole, no manipulation of the screen parts being necessary in order to mount the screen in the body or in the ventilator.

A still further object is a screen employing a plurality of screened frames connected to each other by flexible joints, such as wire loops, etc., and provided with additional members which can be mounted on the ventilator parts by means of screws, etc.

Still other objects will readily occur to those skilled in the art upon reference to the following description and the accompanying drawings in which:

Figure 1 shows a ventilator provided with a screen of the invention.

Figure 2 is a transverse section of Figure 1 as if on the line 2 of Figure 1.

Figure 3 is a view like Figure 2, but with the ventilator shown as closed.

The ordinary cowl ventilator includes a rim 10 which is adapted to be secured to the edges of an opening in the cowl of an automobile, the rim 10, being a stationary part of the ventilator. On its rearward edge the rim is provided with a pair of projections 12 to which is pivotally connected the cross bar 14, the pivots being disclosed at 16. Secured to the cross bar is a back plate 18, the plane of the plate being transverse to the plane of the rim 10, and secured to the upper edge of the back plate as by the portions 20, is the cover or shutter 22. The back plate 18 is provided with an operating member 26 whereby it may be moved with respect to the rim 10 and holding parts or links for the same are provided, such parts including a bracket 28 secured to the forward edge of the rim 10 on its under surface, a link 30 pivotally connected at 32 to the bracket 28 and a coiled spring 34, shown diagrammatically, having one end secured to the cross bar 36 which connects parts 12 to each other, and one end connected to the link 30 at the point 38. The link 30 is provided with a round saw-tooth edge 40 which cooperates with a pin 42 secured to the operating member 26 so that the back plate 18 and the cover 22 will be held in any desired position by the tension of the coil spring 34.

The construction thus far described is more or less conventional, except insofar as it is covered by the claims appended hereto and forms no part of the present invention which concerns itself mainly with the screening of the opening in the rim 10.

Secured to the ends of the back plate are side wings 50, each of which projects forwardly towards the forward edge of the rim 10 until it is substantially adjacent the latter. The screen proper includes an L-shaped securing portion 52 held to the forward edge of the rim 10 by means of screws 54. Secured to the member 52 by means of the coiled continuous wire loop connecting means disclosed at 56 is a frame 58 in which the wire mesh 60 is disposed. A similar frame 62, having a wire mesh 63, is secured to the frame 58 by means of the coiled continuous wire loop connecting joint 64 and the frame 62 is secured to an additional securing means 66 by means of the coiled wire 68. The member 66 is secured to the back plate by means of the screws 70 as disclosed. The length of the frames 58 and 62 and of the securing members is such that they extend from one side wing 50 to the other.

An important feature of the screen disclosed is the ease with which it can be manufactured and the facility with which it can be mounted thereon. For example, the frames 58 and 62 which are substantial duplicates may be provided with the mesh 60 and 63. They may be then joined to each other and to the securing members 52 and 66 by means of the coiled continuous wire loop previously referred to. The screen unit which now includes the four parts 52—58—62—66 is then mounted as a whole in the ventilator by means of the screws 54 and 70 and no adjustment or manipulation of the screens themselves is necessary.

It will also be observed that the screens fill the opening in the cowl ventilator and since they are movable with respect to the stationary parts, that is to say, since they form a flexible screen, no bending or straining of metal is necessary. While in the ventilator shown, the part 10 has been described as a rim, it will be understood that it might well be any plate having an aperture whose edge is the equivalent of the rim.

Now having described the invention and the preferred embodiment thereof, it is to be understood that the said invention is to be limited, not to the specific details herein set forth, but only by the scope of the claims which follow:

What I claim is:

1. In a cowl ventilator having a stationary rim, a movable back plate disposed within said rim with its plane transverse to the plane of the rim, a cover secured to the upper edge of the plate, and a flexible screen having its forward edge secured to the forward edge of the rim and having its upper edge secured to the back plate adjacent the upper edge of the latter, the screen including a plurality of wire mesh frames movably secured to one another and to the ventilator parts aforementioned.

2. In a cowl ventilator having a stationary rim, a movable back plate disposed within said rim with its plane transverse to the plane of the rim, a cover secured to the upper edge of the plate, and a flexible screen having its forward edge secured to the forward edge of the rim and having its upper edge secured to the back plate adjacent the upper edge of the latter, the screen including a plurality of wire mesh frames movably secured to one another and to the ventilator parts aforementioned, the means for securing the frames to the ventilator parts including readily detachable fasteners, thus permitting the facile securing of the completed screen to the parts.

ALFRED ZECH.